W. Blackburn,
Gage Lathe,

Nº 13,208. Patented July 10, 1855.

UNITED STATES PATENT OFFICE.

WILLIAM BLACKBURN, OF JERSEY CITY, NEW JERSEY.

AUTOMATIC MACHINE FOR TURNING SHIP-SPARS, &c.

Specification of Letters Patent No. 13,208, dated July 10, 1855.

*To all whom it may concern:*

Be it known that I, WILLIAM BLACKBURN, of Jersey City, in the county of Hudson and State of New Jersey, have invented a new and Improved Machine for Turning Ship Timbers, Spars, Masts, and other Heavy Bodies of Wood; and I do hereby declare that the same is fully represented and described in the following specification and the accompanying drawings, letters, and figures thereof.

Figure 1:
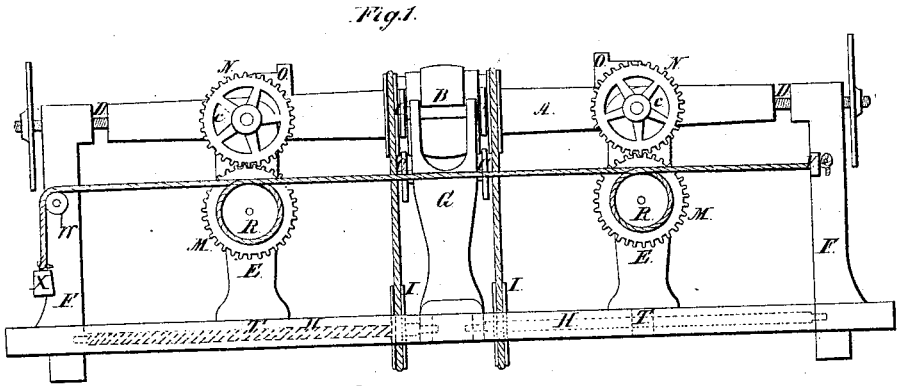
Figure 2:
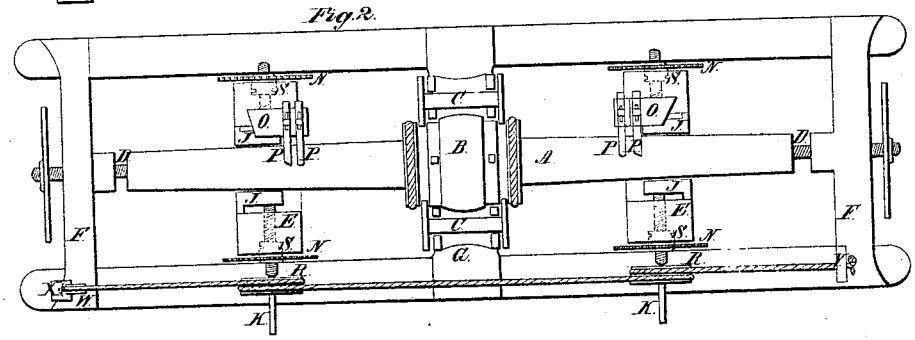
Figures 3, 4, 5:
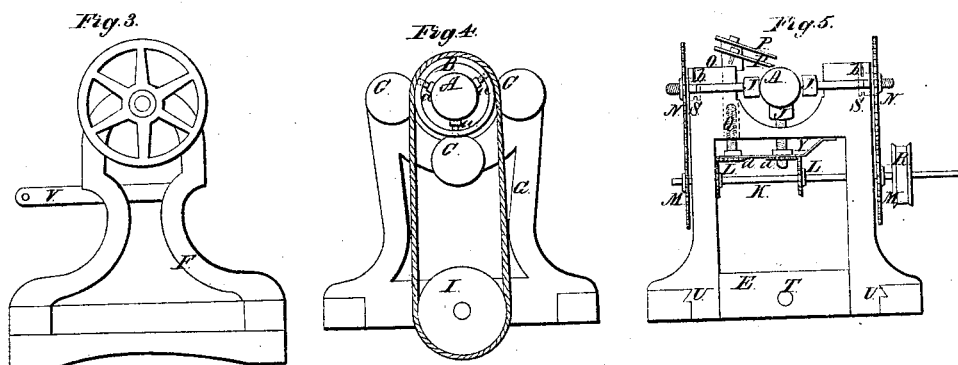
Figures 6, 7:
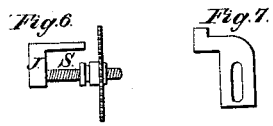

Of the said drawings Figure 1, represents a side elevation of the machine. Fig. 2, denotes a top view of it. Fig. 3, denotes an end view of the frame or head of the machine. Fig. 4, denotes an end view of the center of the frame with its drawing apparatus. Fig. 5, denotes an end view of the carriage. Fig. 6, denotes a sectional view of one of the self-adjusting rests. Fig. 7, shows a front view of the chisel holder detached from the machine.

A, is the spar or body of wood to be turned.

B, is the driving pulley or sleeve which is adjusted on the piece to be turned by set screws or other devices to hold it.

C, C, C, are friction rollers to reduce the friction on the driving pulley.

D, D, are the centers on which the material to be turned rotates.

E, E, are the carriages of the machine.

G is also a part of the frame which supports the driving pulley.

H is the screw which feeds the carriage.

I is a pulley on the screw.

J, J, J, are adjustable rests to support the log while turning.

K is a shaft passing through the carriage on which are placed gears to work the adjustable rests.

L, L are gears on the shaft K, one of which works the under adjustable rest, the other the chisel or tool holder O.

M M are two gears placed on the shaft outside the carriage which work another set of gears.

N N are gears which the adjustable horizontal rests.

O is the chisel or tool holder.

P, P are the chisels or tools for turning.

Q is a screw which adjusts the chisel holder or stock to the varying size of the piece to be turned.

R, R are pulleys placed on the shafts K which pulleys receive a motion as the carriages are fed along by means of the cord which is made fast at one end to a stationary bar V, and then passed around the pulleys thence over a roller W and attached to the weight X for keeping it always tight.

Y is a bar to which are attached the boxes which support the gears d, d.

In working the machine the article to be turned is passed through the sleeve or pulley (B) which is made fast thereon at or near the center of the stick or piece to be turned by set screws seen at (a, a, a) which will allow the pulley to be adjusted to run true, the ends of the stick are secured upon the centers (D, D,) which allow it to rotate freely. On the driving pulley there are cut grooves to admit the periphery of the friction rollers (C, C, C) which rollers rest in suitable bearings in the frame. On the driving pulley there are also cut grooves for the cord connecting with the pulley (I). As the driving pulley rotates it imparts a rotary motion to the pulley (I) which is fast upon the screw H: the screw passes through a nut in the carriage (E) which nut is seen at (T) and as the screw is turned works the carriage toward or away from the driving pulley.

The carriage is dove-tailed into the frame as seen at (V) in Fig. 5 and arranged to slide freely. On the shaft (K) which passes through the frame of the carriage there is placed a pulley (R) which receives a rotary motion as the carriage is fed along by the rope which passes around the pulley as seen in Figs. 1 and 2. On the shaft (K) there are two gears (M, M) which are outside the carriage frame and work into gears (N, N) placed above the others; these last named gears have a groove cut in the hub into which is inserted a pin (b) seen in Fig. 5, the hubs of these gears are secured in a box so as to admit of a rotary movement only. In this gear is cut a thread which works the screw back and forth as the gear is turned, which is seen in Figs. 2, 5 and 6. On the ends of the screws are placed the rests which are dovetailed into the frame of the machine as seen at (c, c) in Fig. 1. On the shaft (K) there are two gears (L, L) which work into gears seen at (d, d). The gears (d, d) have hubs with grooves cut therein, and are adjusted in the bar (Y) so as to allow them a rotary motion only. These gears have a thread cut in them for the screws. One of the screws works the adjustable rest (J) on the under side of the stick to be turned, the other serves to raise and lower the tool stock; the stock is dovetailed into the frame of the machine which is partially seen at O, in Fig. 2, and is also slotted to receive the screw through it which works the rest on that side. The tool stock is seen in Fig. 7 detached from the machine which is a front view of it. The cutters or chisels are seen at (P, P) in Figs. 2 and 5 and are slotted to make them adjustable and fastened securely by screws to the stock.

One part of my invention is to always hold the stick firm and steady during the operation of turning, and which I accomplish by the self adjusting rests, which are worked by gears on the shaft (K). The cutters and rests are adjusted at the end of the stick to be turned. As the stick commences its revolutions it imparts the feed motion to the carriage by the cord passing around the pulley (I) on the screw (H). As the carriage travels it imparts a slow motion to the wheel (R) which is fast upon the shaft (K) which motion it receives from the cord which is fast at one end on the bar (V) and passed around the pulley (R) while the other end is kept tight by means of the weight (X). During the revolution of the shaft K the gears are kept at work graduating themselves to the varying size of the stick to be turned, by means of the gears (N, N and $d$) seen in Fig. 5 which as they revolve draw the rests away from the stick as it grows tapering. I would here remark that the size of the pulley (R) on the shaft K must be determined by calculation, according to the tapering of the stick in order to impart the proper motion to the graduating rests. Were the stick to be turned straight the cord may be detached from the pulley R.

Another part of my invention is to graduate the tools to the varying size of the stick which is done by means of the screw (Q) and gear ($d$,) which is moved simultaneously with the graduating rests and raises the tool stock and cutters as fast as the rests recede from the stick while turning.

Having thus described my improved machine for turning spars, masts and other heavy bodies of wood what I claim as new therein and desire to secure by Letters Patent is—

1. The combination and arrangement of the gears N, N, and $d$ with the self adjusting rests J, J, J, or mechanism substantially the same, for holding the stick whether straight or tapering always firm and steady during the operation of turning.

2. I claim the combination of the chisel holder O, screw Q, and gear $d$, (or mechanism equivalent thereto) for working the chisel holder simultaneously with the self adjusting rests substantially as described and for the purpose set forth.

WILLIAM BLACKBURN. [L. S.]

Witnesses:
  WILLIAM H. JELLIFF,
  ARCH K. BROWN.